United States Patent
Petrick et al.

(10) Patent No.: US 10,291,717 B2
(45) Date of Patent: May 14, 2019

(54) PRIORITIZING VDI SESSIONS AND REDIRECTED DEVICES IN SOFTWARE DEFINED NETWORKS

(71) Applicant: Wyse Technology L.L.C., Santa Clara, CA (US)

(72) Inventors: Christopher Stephen Petrick, Cedar Park, TX (US); Jyothi Bandakka, Bangalore (IN); Gokul Thiruchengode Vajravel, Bangalore (IN)

(73) Assignee: WYSE TECHNOLOGY L.L.C., Santa Clara, CA (US)

( * ) Notice: Subject to any disclaimer, the term of this patent is extended or adjusted under 35 U.S.C. 154(b) by 346 days.

(21) Appl. No.: 15/433,406

(22) Filed: Feb. 15, 2017

(65) Prior Publication Data
US 2018/0234502 A1  Aug. 16, 2018

(51) Int. Cl.
*G06F 15/173* (2006.01)
*H04L 29/08* (2006.01)
*H04L 12/931* (2013.01)
*H04L 29/06* (2006.01)

(52) U.S. Cl.
CPC ............. *H04L 67/14* (2013.01); *H04L 49/70* (2013.01); *H04L 67/2814* (2013.01); *H04L 67/42* (2013.01)

(58) Field of Classification Search
USPC ....... 709/203, 206, 217, 219, 223, 224, 226, 709/228, 230, 232, 238; 711/6; 370/328
See application file for complete search history.

(56) References Cited

U.S. PATENT DOCUMENTS

| | | | |
|---|---|---|---|
| 2009/0144342 A1* | 6/2009 | Sudhakar | G06F 16/1873 |
| 2010/0153617 A1* | 6/2010 | Miroshnichenko | G06F 3/061 |
| | | | 711/6 |
| 2011/0058520 A1* | 3/2011 | Keller | H04W 76/11 |
| | | | 370/328 |
| 2017/0178600 A1* | 6/2017 | Wei | G09G 5/393 |

* cited by examiner

*Primary Examiner* — Quang N Nguyen
(74) *Attorney, Agent, or Firm* — Kirton McConkie; Brian Tucker (57) ABSTRACT

VDI sessions and virtualized devices can be prioritized in Software-Defined Networks. A server-side agent can communicate with a management server to provide VDI session details indicative of how the VDI session is being employed. The management server can then update a flow table in a Software-Defined Network based on the VDI session details. In this way, the network traffic pertaining to a VDI session can be prioritized based on how the VDI session is being used. A flow table can also be updated in conjunction with commencing or completing an imaging process.

19 Claims, 11 Drawing Sheets

PRIORITIZING VDI SESSIONS AND REDIRECTED DEVICES IN SOFTWARE DEFINED NETWORKS

CROSS-REFERENCE TO RELATED APPLICATIONS

N/A

BACKGROUND

The present invention is generally directed to prioritizing network traffic in virtual desktop infrastructure environments including those in which devices are redirected for virtualization on the server. In this context, prioritizing can be construed as raising or lowering the priority. Device redirection generally refers to making a device that is connected to a client accessible within a virtual desktop as if the device had been physically connected to the virtual desktop. In other words, when device redirection is implemented, a user can connect a device to his or her client terminal and the device will function as if it had been connected to the server.

Figure 1:
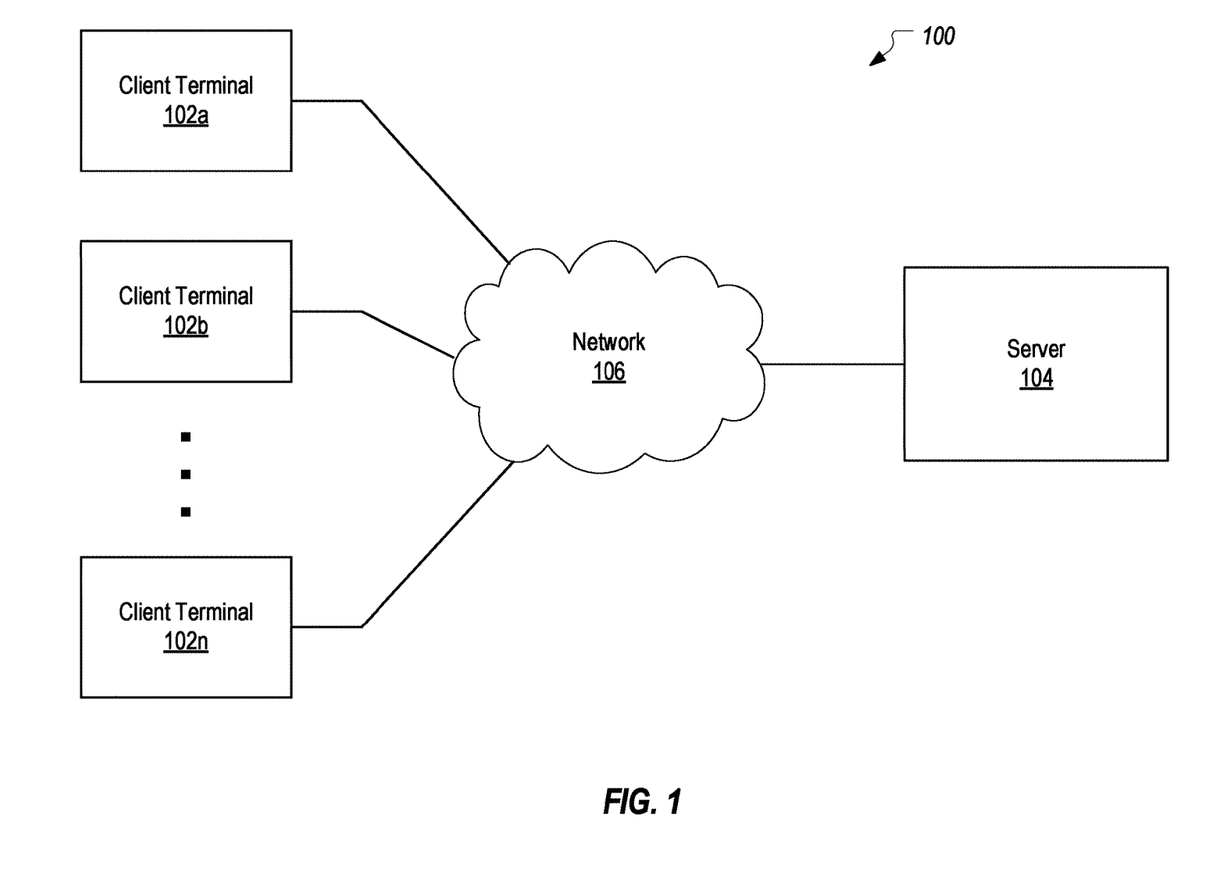
FIG. 1 illustrates an example computing environment in which the present invention can be implemented.
Figure 2:
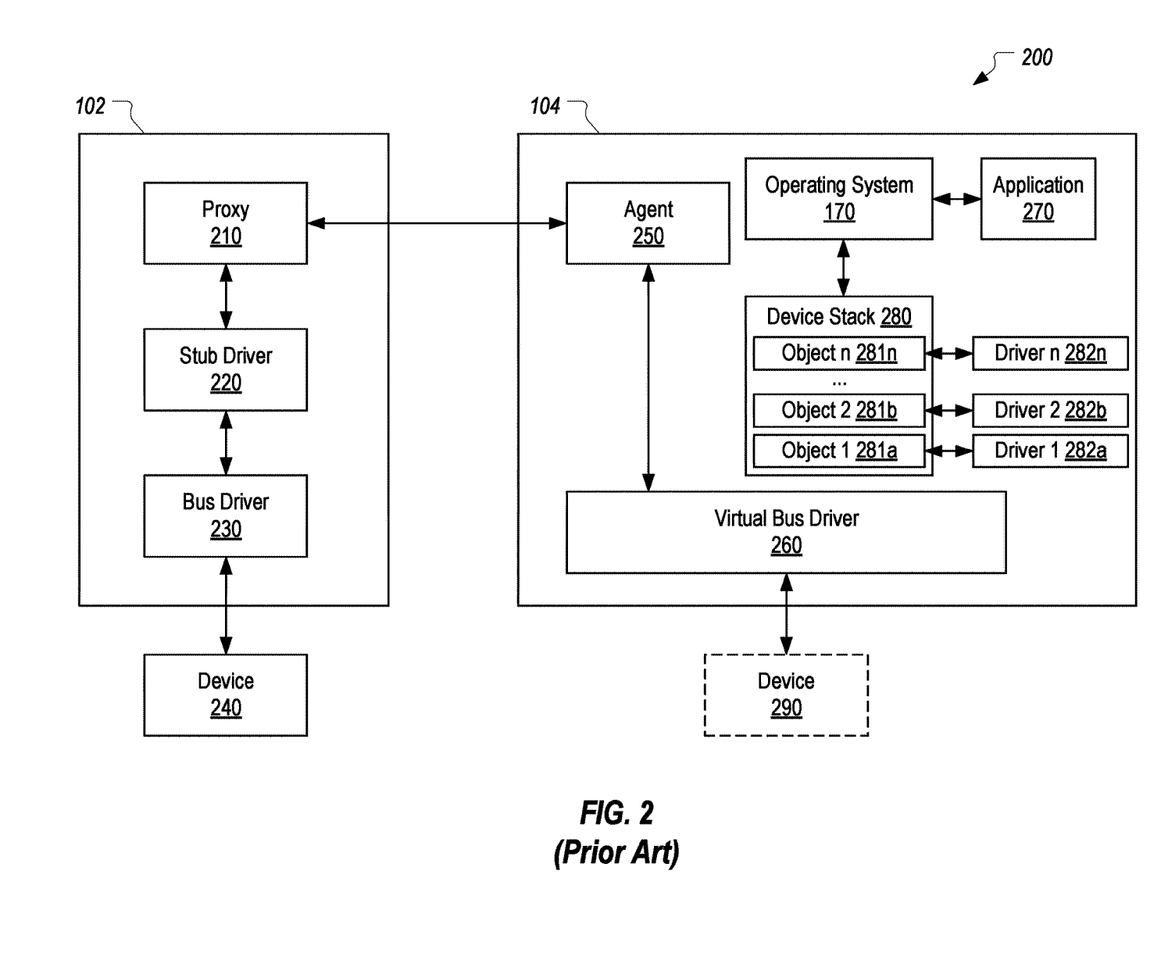
FIG. 2 illustrates how a USB device can be redirected from a client terminal to a server.

FIGS. 1 and 2 and the following description will provide a general overview of how device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote (or VDI) session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2 is a block diagram of a local device virtualization system 200 in accordance with some embodiments of the present invention. FIG. 2 depicts a redirection scenario that is performed at the USB device level and is only one example of how redirection may be implemented in the present invention. Other redirection/virtualization techniques, e.g., disk level redirection and driver mapping, may also be implemented and are understood by those of skill in the art.

System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270

(either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

Software-defined networking (SDN) is a network organizing technique in which the data and control functions of networking devices are separated. An SDN controller controls access to the underlying networking devices and communicates with them via a defined standard (e.g., the OpenFlow standard). The SDN controller also provides an API by which applications can implement changes in the underlying networking devices.

Of primary importance to the present invention is the use of flow tables in an SDN environment. One or more flow tables are maintained on an SDN-enabled switch and define how packets of a "flow" should be handled. A flow can be viewed as a sequence of network packets that share a set of header field values. In a common scenario, a flow can be a sequence of network packets that share the same source and destination IP addresses. Among other things, a flow table entry defines match fields that are used to select packets to which the entry applies and a priority to apply to matching packets. These match fields typically include an ingress port, Ethernet source and destination addresses, IP source and destination addresses, TCP or UDP source and destination ports, among others.

When a packet is received at an SDN-enabled switch, the packet will be examined to identify if it matches an entry in a flow table, and if so, the matching entry is used to determine how to handle the packet. A flow table may also include an entry that defines how to handle a packet that does not match any other entry in the flow table. Various types of instructions or actions can be defined for matching packets such as which port to forward the packet to, a queue ID for the packet (which affects scheduling of the packet for QoS purposes), whether to forward the packet to another flow table, etc. In short, the entries of a flow table define how network traffic will traverse the SDN, and the SDN controller allows the flow table to be updated via a known API.

Various problems relating to network traffic exist in VDI environments due to the fact that significant data transfers must be made over the network between the client terminal and server. For example, if a number of users with sessions on the same server (or at least on servers that share a common network) are matching multimedia within a VDI session, a large amount of network bandwidth will be required to transfer the multimedia content to the client terminals. Similarly, if a large number of client terminals are redirecting devices to a server, network load may increase dramatically as data transfers are made to/from the redirected devices thereby slowing data transfers to/from such devices as well as other network communications. With some devices such as printers or scanners, degraded network performance may not be an issue. However, with others such as a redirected mass storage device, the degraded network performance may unacceptably degrade an application's performance. Also, the degraded network performance may unacceptably diminish the performance of standard remote session functionality such as the transfer of desktop display data or input data.

In current VDI environments, including those that employ SDN, there is not a way to prioritize network traffic based on how a remote session is being used. For example, although it is possible to prioritize all network traffic between a particular client terminal and the server on which a remote session is established, it is not possible to dynamically adjust the priority of network traffic based on how the user is employing the remote session.

BRIEF SUMMARY

The present invention extends to methods, systems, and computer program products for prioritizing VDI sessions and redirected devices in Software-Defined Networks. A server-side agent can communicate with a management server to provide VDI session details indicative of how the VDI session is being employed. The management server can then update a flow table in a Software-Defined Network based on the VDI session details. In this way, the network traffic pertaining to a VDI session can be prioritized based on how the VDI session is being used. A flow table can also be updated in conjunction with commencing or completing an imaging process.

In some embodiments, the present invention is implemented as a method for managing flows in a SDN. A device agent on a VDI server can detect a change in a status of a VDI session. The device agent can then notify a management server of the change in the status of the VDI session, including providing VDI session details for the VDI session. Based on the change in the status, the management server can update a flow table of the SDN using the VDI session details.

In another embodiment, the present invention is implemented as a method for managing flows in a SDN. A management server can determine that a client terminal is to be imaged, and in response, update a flow table in the SDN to prioritize flows pertaining to the client terminal. Additionally, the management server can instruct an imaging repository to commence imaging the client terminal. Upon receiving notification that the imaging of the client terminal has completed, the management server can update the flow table to cease the prioritization of the flows pertaining to the client terminal.

In another embodiment, the present invention is implemented as computer storage media storing computer executable instructions which when executed by one or more processors implement a method for prioritizing flows in a SDN. The method includes: detecting, at a device agent that is executing on a VDI server, a change in status of a VDI session established by a client terminal on the VDI server; sending, by the device agent, a notification of the change in status to a management server, the notification including VDI session details for the VDI session; and, in response to the notification, updating, by the management server, a flow table of the SDN to create, update, or delete a flow table entry pertaining to the VDI session.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

The present invention can be implemented as part of a virtual desktop infrastructure (VDI) environment to prioritize network traffic pertaining to a VDI session based on how the VDI session is being used. A VDI session can be established using any remote display protocol including, for example, Microsoft's Remote Desktop Protocol (RDP), Citrix's Independent Computing Architecture (ICA), VMWare's PC-over-IP (PCoIP), Dell's vWorkspace (EOP), etc. The present invention may also be employed to prioritize network traffic pertaining to an imaging process.

Figure 3:
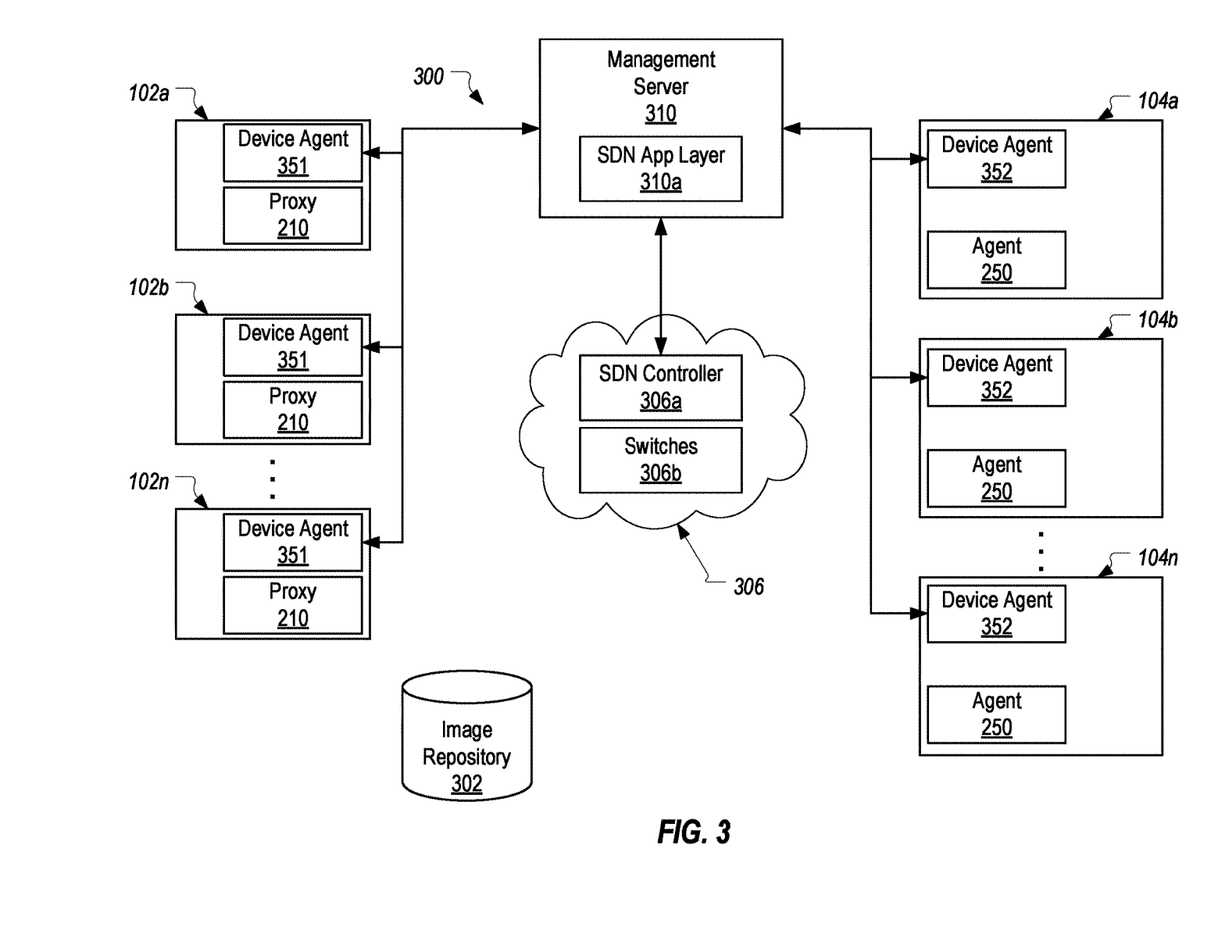
FIG. 3 illustrates an example VDI environment in which the present invention can be implemented.

FIG. 3 illustrates an example VDI environment 300 in which the present invention can be implemented. VDI environment 300 includes any number of client terminals 102a-102n and any number of servers (including a single server) 104a-104n that employ a SDN 306 for the purpose of establishing VDI sessions. As was described in the background, each of client terminals 102a-102n can include proxy 210 and each of servers 104a-104n can include agent 250 for establishing and maintaining these VDI sessions. Although not shown, client terminals 102a-102n and servers 104a-104n can also include other components to enable the redirection of devices as described in the background.

In VDI environment 300, a client-side device agent 351 and a server-side device agent 352 is also included in each client terminal and server respectively. Device agents 351, 352 can be configured to communicate with management server 310 to allow the client terminals and servers to be managed as is known in the art.

In accordance with embodiments of the present invention, device agent 352 can also be configured to communicate with management server 310 for the purpose of allowing SDN 306 to be configured based on how a VDI session is being employed. Management server 310 is shown as including a SDN app layer 310a by which management server 310 can to employ the appropriate APIs to communicate with SDN controller 306a which will in turn update switches 306b (e.g., flow tables on switches 306b) based on VDI session details received from the various device agents 352. VDI environment 300 is also shown as including an image repository 302 from which images can be deployed to client terminals 102a-102n. Management server 310 can also cause switches 306b to be updated based on an imaging process as will be further described below.

For purposes of the present disclosure, the term "VDI session details" should be construed as including one or more of: a VDI session Id, a version of the server-side OS, a username of a user of a client terminal, any policies that apply to the user, which remote display protocol and port is used to establish the VDI session, redirected device information (e.g., USB hardware identifiers, USB class, subclass, and/or protocol, USB speed/protocol, etc.), network connection information (e.g., network ports used and/or open, IP information (e.g., IPv4 header and ToS field, IPv6 header and Traffic class field, etc.), MAC address, IEEE 802.3 information (e.g., Ethernet header, address, Ethertype, etc.), 802.1Q information (e.g., VLAN tag), RFC 3032 information (e.g., PBB I-TAG and I-SID), RFC 7348 information (e.g., VxLAN header), etc.).

By way of overview, device agent 352 can be configured to share, with management server 310, VDI session details for a particular VDI session in response to various occurrences such as, for example: when a VDI session is connected or disconnected, when a redirected device is added to or removed from the server, or when multimedia redirection is started or stopped. Based on the VDI session details for a particular VDI session, management server 310, via SDN app layer 310a, can communicate with SDN controller 306a to update one or more flow tables on switches 306b to adjust the priority of flows pertaining to the particular VDI session. For example, when the VDI session details indicate that a particular VDI session is being employed to redirect a mass storage device, a flow table can be updated to prioritize flows pertaining to the particular VDI session. In this way, the VDI session's network traffic can be prioritized based on the fact that a mass storage device is redirected to the VDI session.

FIGS. 4A-4E illustrate how SDN 306 can be updated to prioritize flows pertaining to a VDI session when the VDI session is used to redirect a device. In FIGS. 4A-4E it will be assumed that client terminal 102a has established a VDI session on server 104a via a remote display protocol connection 400 and that a mass storage device 240 has been connected to client terminal 102a.

Figure 4A:
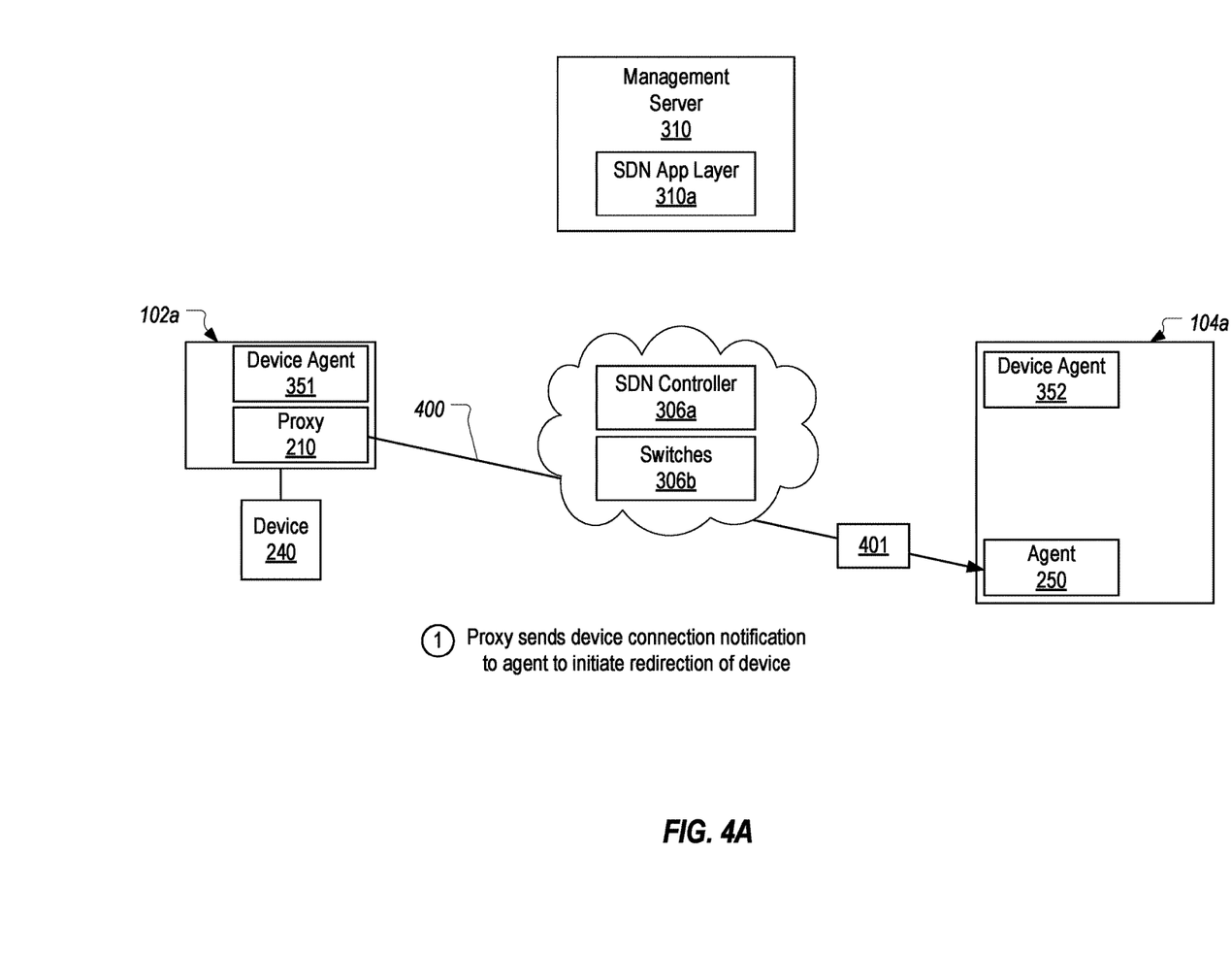
FIGS. 4A-4E illustrate how a management server can be caused to update a flow table in response to a change in the status of VDI session.

In response to device 240 being connected to client terminal 102a, proxy 210 obtains information about device 240 (e.g., USB hardware identifiers, USB class, subclass, or protocol, a supported USB speed and/or protocol, etc.) and sends, in step 1 shown in FIG. 4A, a device connection notification 401 to agent 250 which includes this information. As was described in the background, in accordance with redirection techniques, agent 250 will use the information contained in device connection notification 401 to virtualize device 240 on server 104a.

Figure 4B:
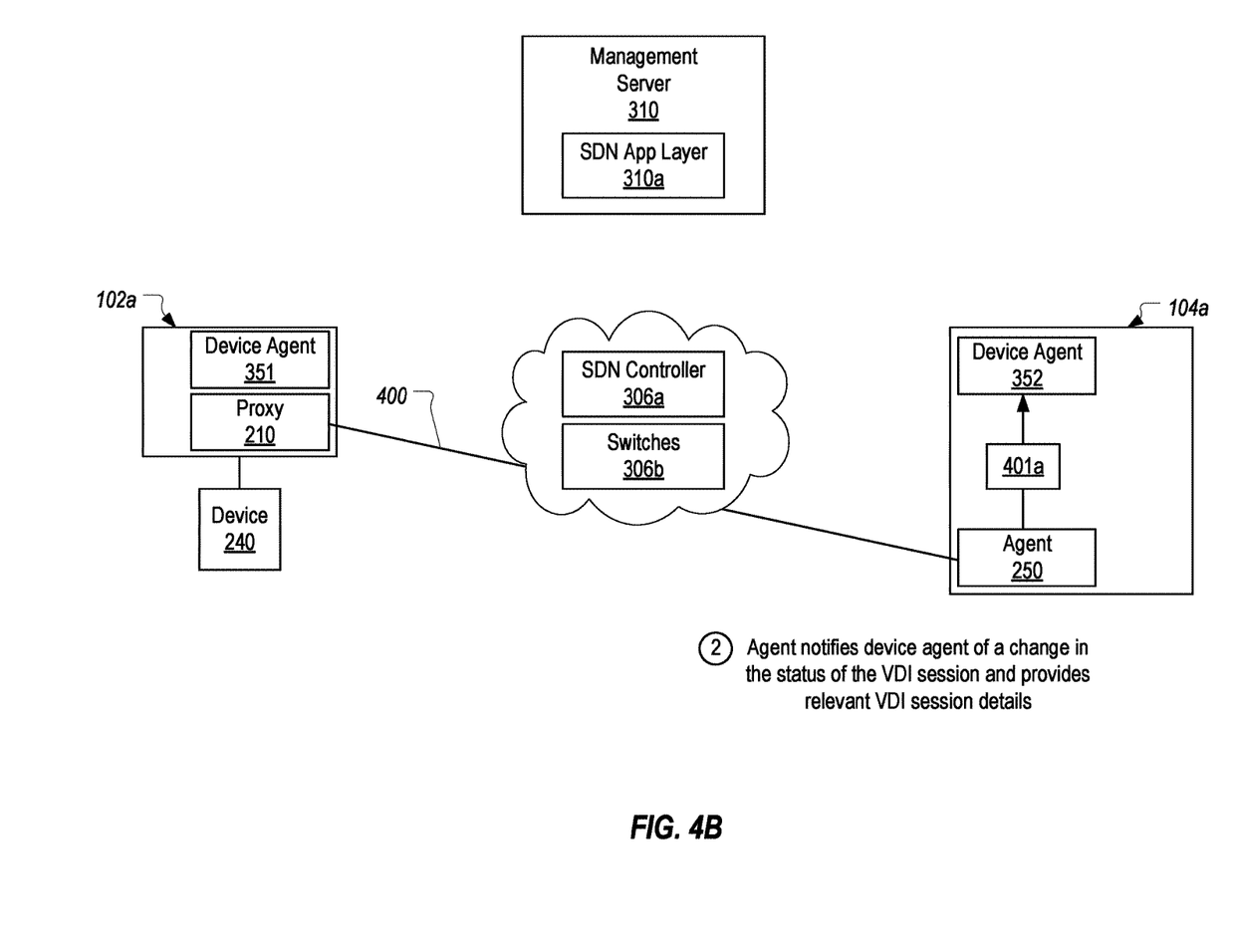

Additionally, in accordance with embodiments of the present invention, and as represented by step 2 in FIG. 4B, agent 250 can provide VDI session details 401a to device agent 352. VDI session details 401a can be based, at least partially, on the content of device connection notification 401. In particular, VDI session details 401a can include information about device 240. VDI session details 401a can also include information sufficient to identify remote display protocol connection 400 (or any other network connection that will be employed for the redirection of device 240) such as an IP address of client terminal 102a or server 104a, the client-side and/or server-side port used to establish connection 400, a MAC address of client terminal 102a and/or server 104a, or any of the other types of network connection information described above. In short, the contents of VDI session details 401a can depend on the matching criteria that is employed by SDN 306 in flow tables as well as criteria that may be employed by management server 310 to identify applicable policies. In some cases, some of the content of VDI session details 401a can be directly determined by device agent 352 (e.g., the IP address of server 104a).

Figure 4C:
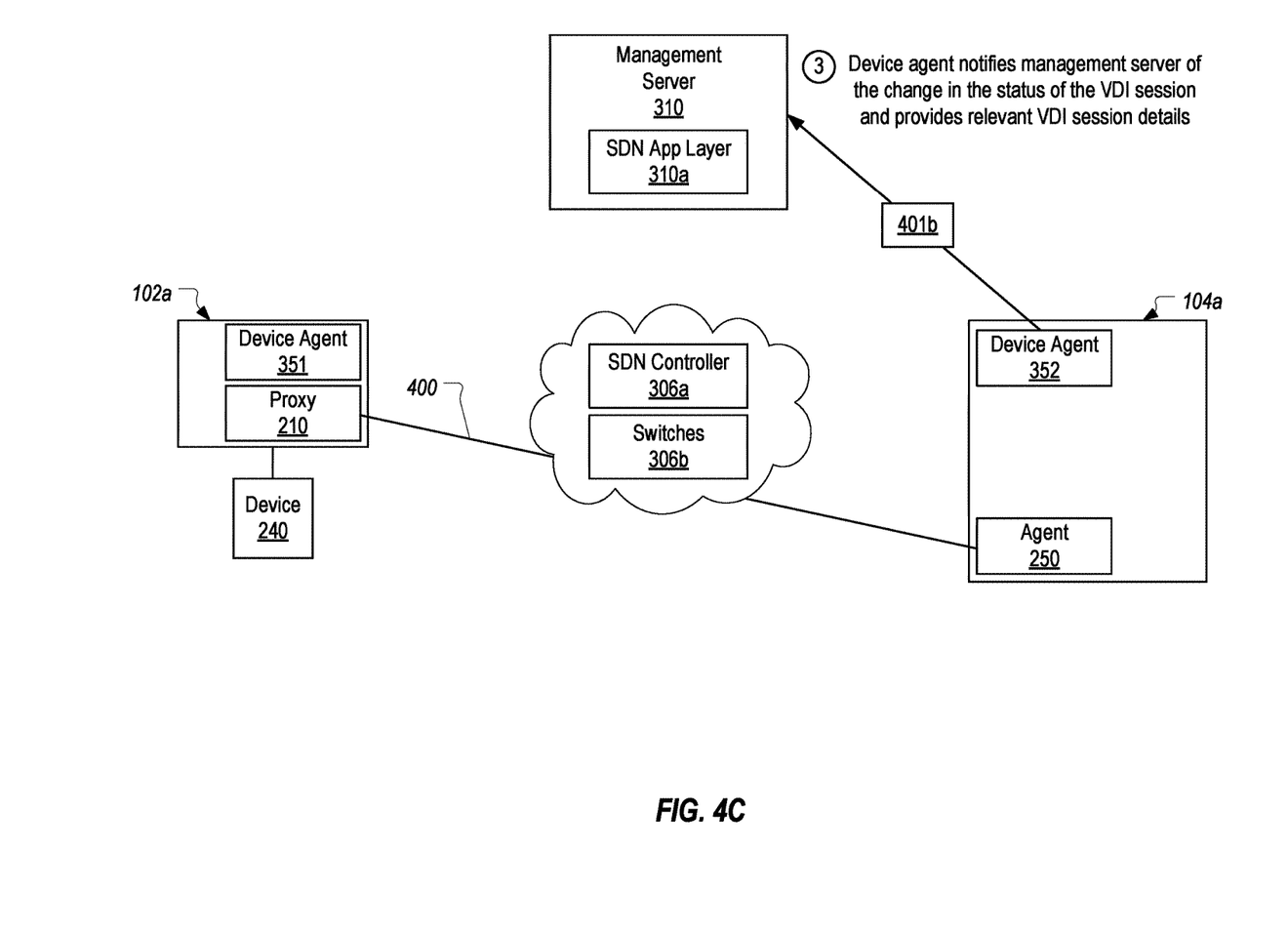
Figure 4D:
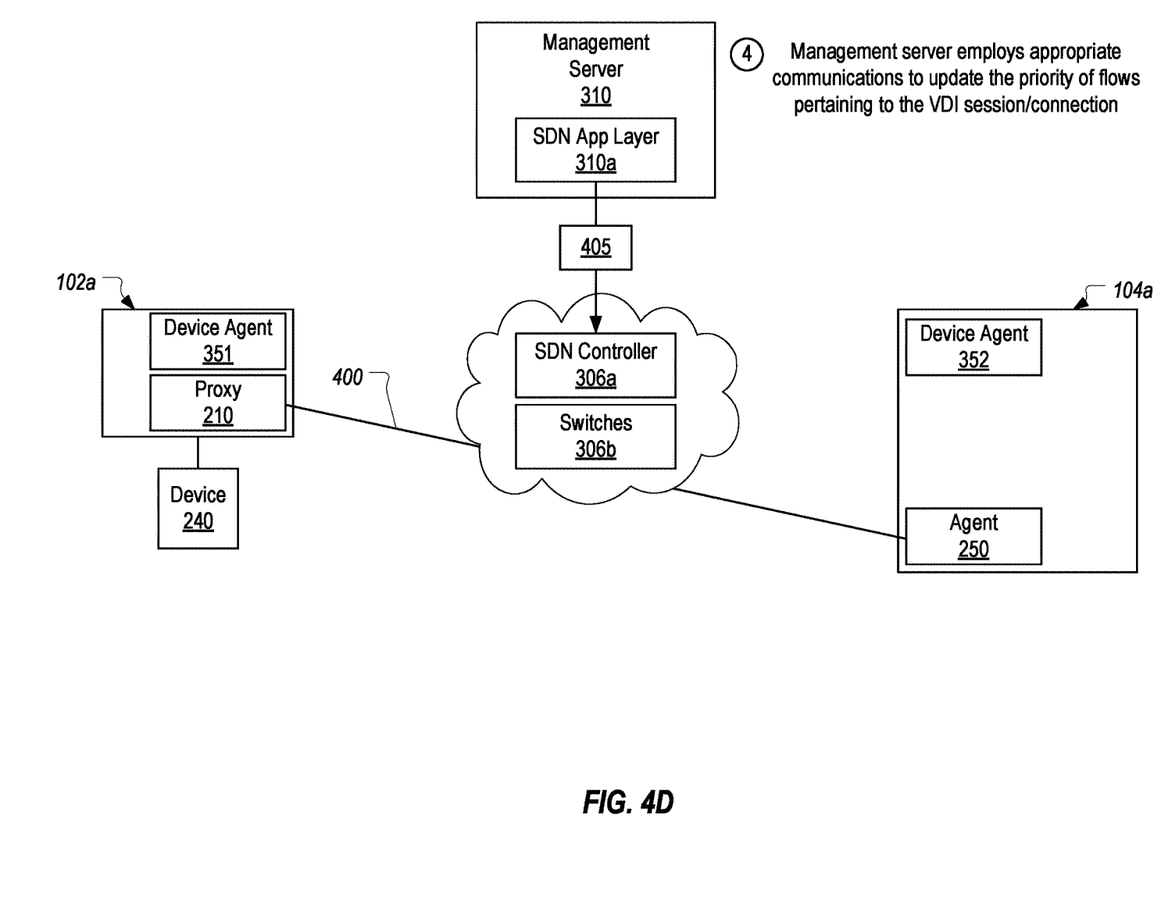

Next, in step 3 shown in FIG. 4C, device agent 352 can send a notification 401b to management server 310 which indicates that device 240 is being redirected to server 104a via connection 400. Notification 401b can include some or all of VDI session details 401a and possibly additional VDI session details obtained by device agent 352 directly. Importantly, the VDI session details in notification 401b can include sufficient information to identify connection 400 as well as information about device 240. In some embodiments, the VDI session details in notification 401b may include information for identifying an applicable policy (e.g., a username of the user of client terminal 102a), while in other embodiments, this information may have already been provided to or obtained by management server 310 or could be inferred from other VDI session details (e.g., based on the identity of client terminal 102a). In any case, upon receiving notification 401b, management server 310 will be informed of the fact that a particular device is being redirected from client terminal 102a to server 104a via a connection 400 (or possibly one or more other connections).

Upon receiving notification 401b, management server 310 can process the VDI session details to determine whether the priority of flows pertaining to connection 400 (or possibly other connections between client terminal 102a and server 104a) should be adjusted. In this example, it will be assumed that a policy exists that indicates that the priority of flows pertaining to a connection should be increased when a mass storage device is redirected over the connection. Therefore, management server 310 can determine from notification 401b that a mass storage device 240 is being redirected over connection 400 (e.g., based on a USB class, subclass, or protocol included in notification 401b) and, as represented as step 4 in FIG. 4D, can employ proper communication(s) 405 to update one or more flow tables on switches 306b to cause the priority of flows pertaining to connection 400 (or possibly to other identified connections such as when more than one connection is used for the redirection) to be increased.

Figure 4E:
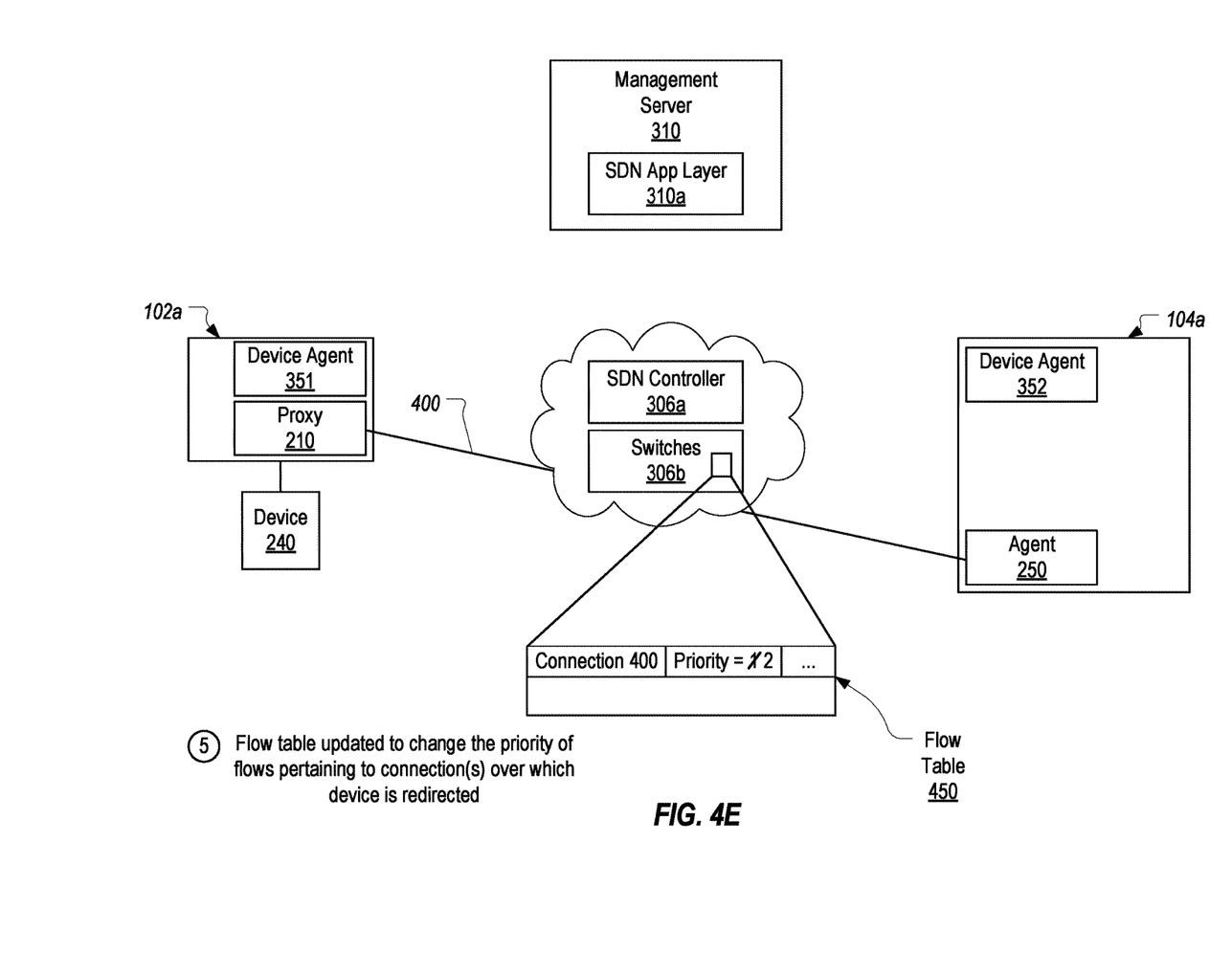

Finally, step 5 in FIG. 4E represents that, in response to communication(s) 405, an entry pertaining to connection 400 in flow table 450 has been updated by changing the priority from 1 to 2 (alternatively, a new entry could have been added to define the increased priority). As there are numerous ways in which flows may be identified in a flow table, FIG. 4E simply represents the matching criteria as "connection 400." In a common example, however, an entry in flow table 450 may include matching criteria identifying the IP and/or MAC addresses of client terminal 102a and/or server 104a and/or one or more port numbers used by client terminal 102a and/or server 104a to perform the redirection.

Although not shown in FIGS. 4A-4E, in some embodiments, agent 250 can be configured to complete the virtualization of device 240 on server 104a only after receiving confirmation from management server 310 that flows pertaining to connection 400 have been prioritized. For example, as is known in the art, the plug-and-play process can include a confirmation notification that the device has been successfully added. Agent 250 can hold off sending such a confirmation notification back to proxy 210 until receiving confirmation from device agent 352 that management server 310 has properly updated the appropriate flow table(s) in SDN 306. In this way, device 240 will not become accessible on server 104a until SDN 306 is configured to prioritize communications targeting device 240.

With flow table 450 updated to reflect a priority of 2 for packets matching the connection 400 entry, any network communications sent over connection 400 would be prioritized. For example, a sequence of packets forming a write request to device 240 could include the IP address of client terminal 102a and the port at which proxy 210 has established connection 400. Switches 306b would receive these packets and determine that they match the connection 400 entry in flow table 450. As a result, these packets will be transferred over SDN 306 with a priority of 2 as opposed to a priority of 1.

Although the above example is limited to updating the priority of flows, the same technique can be employed to update any other network optimization parameter provided by SDN 306. For example, management server 310 may also cause the corresponding entry in flow table 350 to be updated to provide a minimum and/or maximum bandwidth for the flows.

If device 240 is disconnected, a similar process can be performed to return the priority of flows pertaining to connection 400 to their original priority of 1. For example, upon device 240 being disconnected, proxy 210 will send a device disconnection notification. Agent 250 can respond to this device disconnection notification by notifying device agent 352 which can in turn notify management server 310. Based on the applicable policy, management server 310 can determine that flows pertaining to connection 400 should no longer be prioritized (because network connection 400 is no longer being used to redirect a mass storage device) and can therefore use appropriate communications to modify (or delete) the connection 400 entry from flow table 450. In this way, the priority of flows pertaining to connection 400 will be dynamically updated based on how connection 400 is being used.

In the above example, it was assumed that the applicable policy indicated that flows should be prioritized whenever they pertained to a connection that was being used to redirect a mass storage device. Of course, policies that are much more granular may also be defined. For example, the prioritization of flows in this mass storage device redirection scenario may be further based (or alternatively based) on the user of client terminal 102a or his or her user group. As another example, the prioritization of flows may be based on whether the mass storage device supports the USB SuperSpeed feature or some other protocol version or feature. In short, the decision of whether to change the priority of flows when the status of a VDI session changes can be based on any number and/or combination of factors including any of the factors that are commonly employed in Active Directory Group Policy Objects. Of importance to the present invention is that VDI session details are provided to management server 310 to inform management server 310 of changes in the status of a VDI session to thereby allow management server 310 to determine whether to update the priority of flows pertaining to that VDI session.

The process described in FIGS. 4A-4E can similarly be performed when a VDI session is employed to redirect multimedia. In the multimedia redirection scenario, agent 250 can detect that multimedia content has been selected for redirection to a client terminal. In response, agent 250 can notify device agent 352 of the VDI session details (e.g., similar to what is shown in FIG. 4B). The same process depicted in FIGS. 4C-4E can then be performed to prioritize (or otherwise alter) flows pertaining to the redirected multimedia content.

Another example of a change in the status of a VDI session that may cause management server 310 to update a flow table includes the connection and disconnection of a VDI session. In such a scenario, proxy 210 and agent 250 would perform the necessary steps to create the VDI session after which agent 250 could report the VDI session details (e.g., which remote display protocol is being used, the port numbers, IP addresses, and MAC addresses, a username of the user, etc.) to device agent 352 (or device agent 352 could obtain some of this information on its own). Device agent 352 could then notify management server 310 accordingly to allow management server 310 to determine whether an entry in a flow table should be created (or possibly updated) to define how flows pertaining to the VDI session will be managed.

For example, the user may be an administrator or may belong to a group for which a policy defines that network flows should be prioritized. In such a case, management server 310 can determine, based on the VDI session information received from device agent 352, that a VDI session has been established by an administrator or a user in the group and can create an entry in one or more flow tables to prioritize the VDI session's flows. In particular, an entry could be created that defines the IP and MAC address of client terminal 102a and server 104a, the port numbers used by client terminal 102a and server 104a to create the remote display protocol connection, and a priority for matching packets. This process could be reversed in response to a notification from device agent 352 that the VDI session has been disconnected. In this way, all traffic for a VDI session may be prioritized (as opposed to traffic that occurs while a device is being redirected).

Figure 5:
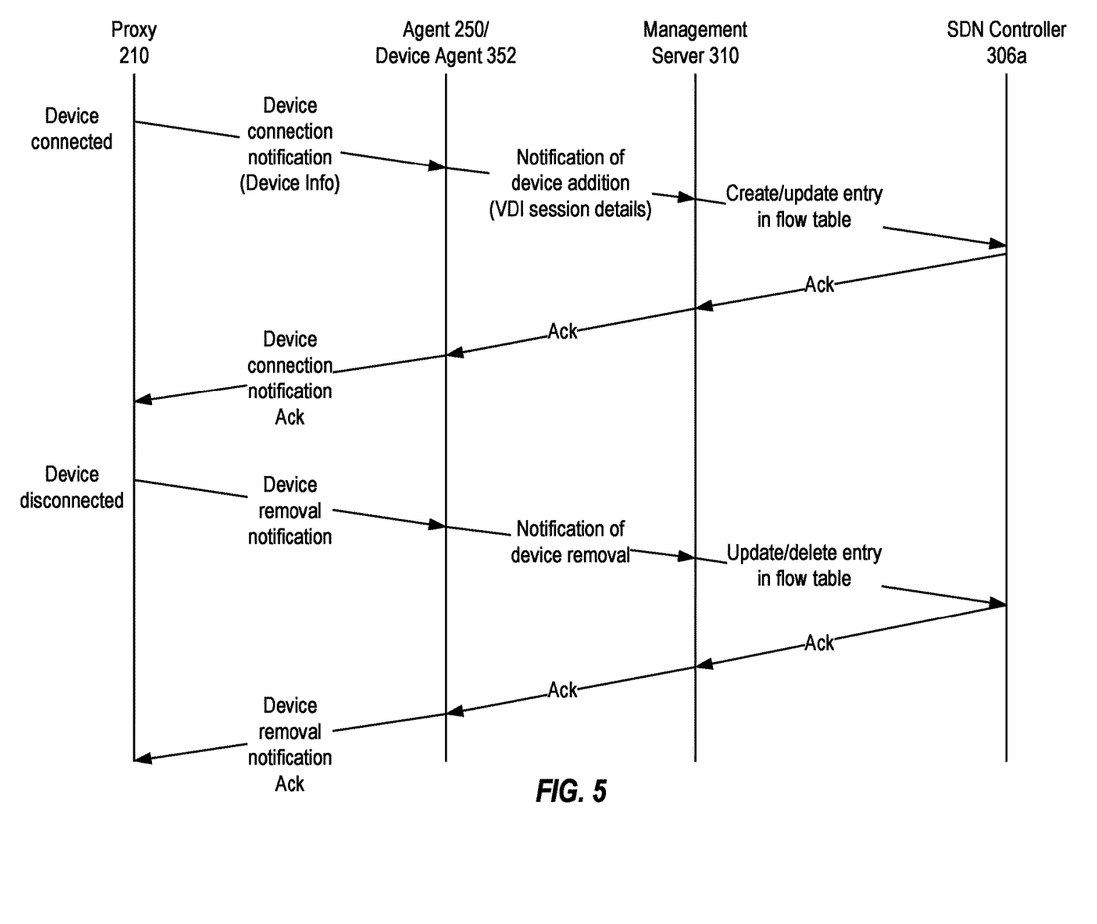
FIG. 5 illustrates a sequence of communications that can be made to dynamically manage flows pertaining to a VDI session when a device is redirected.

FIG. 5 provides a diagram of the sequence of communications that can occur when a device is connected for redirection and then disconnected and summarizes the process shown in FIGS. 4A-4E. Initially, when a device is connected to a client terminal, proxy 210 can send a device connection notification to agent 250 which includes device information. Agent 240/device agent 352 can then send a notification of the addition of the device on the server to management server 310 and include in this notification VDI session details. Management server 310 will then communicate with SDN controller 306a to create and/or update one or more entries in one or more flow tables to manage how flows pertaining to the redirected device (or flows pertaining to one or more network connections over which communications to/from the device will be sent). Assuming SDN controller 306a successfully creates/updates the entry, an acknowledgement will be sent back to management server 310. Management server 310 can then provide a corresponding acknowledgement to device agent 352/agent 250. In response, agent 250 will send an acknowledgment of the device connection notification (assuming the device was successfully virtualized on the server) to thereby inform proxy 210 that the device has been successfully redirected.

A similar process will be performed when the device is disconnected (which may occur in conjunction with or independent of the VDI session being disconnected). As shown, when the device is disconnected, proxy 210 can send a device removal notification. This device removal notification can include sufficient information to identify the device but does not necessarily need to include the same device information that was provided in the device connection notification. In response, agent 250/device agent 352 can send a notification of device removal to management server 310. This notification can again include sufficient information to identify the device and/or the VDI session over which the device was being redirected (i.e., sufficient information to allow management server 310 to identify the entry that was previously created/updated for this redirected device). Based on the notification, management server 310 can send appropriate communications to SDN controller 306a to update and/or delete the one or more entries that were previously created and/or updated. Assuming the entry is successfully updated/deleted, SDN controller 306a can send an acknowledgment to management server 310 which can forward a corresponding acknowledgement to device agent 352/agent 250. Finally, agent 250 can send a device removal notification acknowledgement to proxy 210 thereby completing the device removal process.

Figure 6:
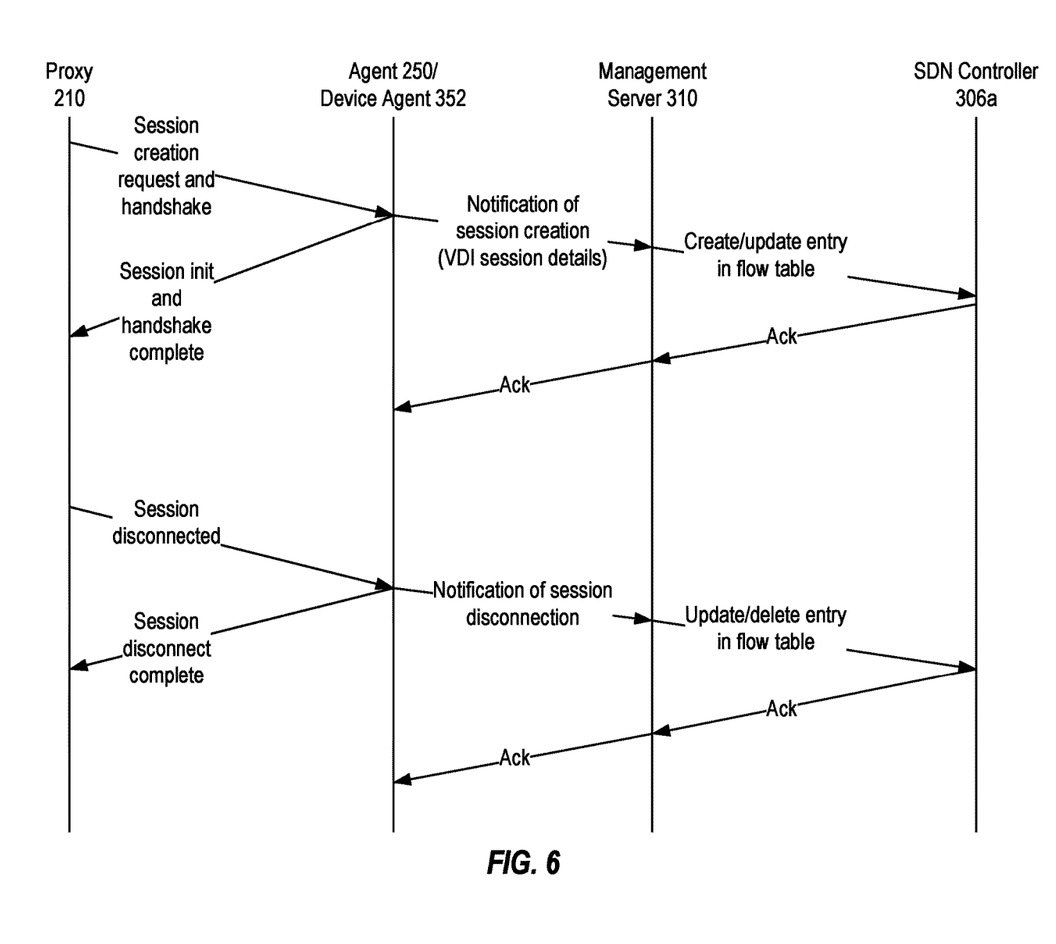
FIG. 6 illustrates a sequence of communications that can be made to prioritize flows pertaining to a VDI session.

FIG. 6 provides a similar diagram of the sequence of communications that can occur when a VDI session is connected and disconnected. Since the overall flow of communications is substantially the same as in FIG. 5, a detailed description will not be provided. Suffice it to say that whenever agent 250 connects or disconnects a session, management server 310 can be provided with the VDI session details necessary to allow one or more entries in one or more flow tables to be created, updated, or deleted so that flows pertaining to the VDI session are managed in accordance with one or more applicable policies.

The techniques of the present invention can also be applied to prioritize flows pertaining to the imaging of client terminals. Returning to FIG. 3, each of client terminals 102a-102n is shown as including device agent 351. For purposes of prioritizing flows pertaining to imaging, device agent 351 can be configured to report "client terminal information" which can include one or more of: the OS and/or image build version on the client terminal, the model and/or revision of the client terminal, hardware information (e.g., CPU, RAM, Flash or other storage information), BIOS/UEFI revision and parameters, OS patches/hotfixes, installed applications, etc. FIG. 3 also shows an image repository 302 that can be coupled to client terminals 102a-102n via SDN 306.

Management server 310 can communicate with device agent 351 to obtain the client terminal information for each of client terminals 102a-102n. This communication of client terminal information could occur at any time including prior to an imaging process. An administrator can interact with management server 310 for the purpose of scheduling the imaging process which will typically be performed during non-peak (e.g., non-business) hours. When a particular client terminal is scheduled for imaging, a similar process to those described above can be performed to prioritize flows pertaining to the imaging.

Figure 7:
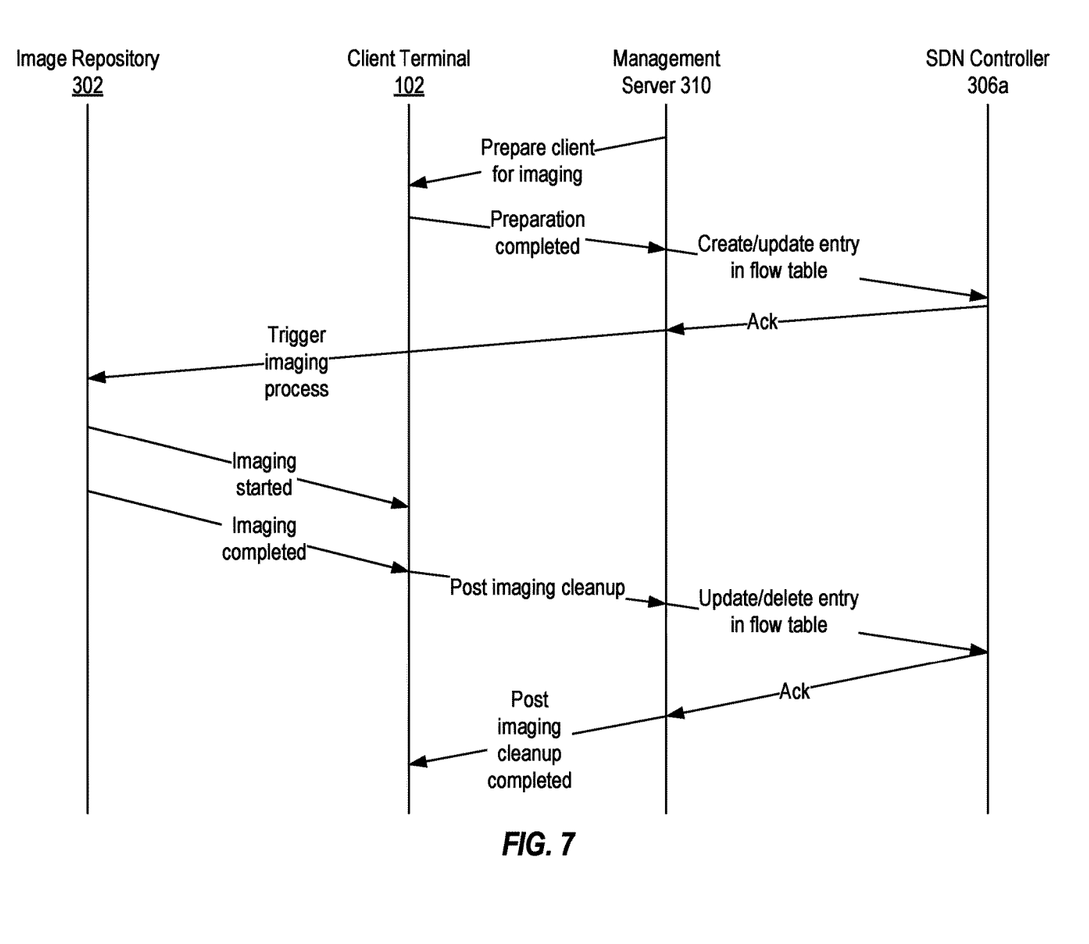
FIG. 7 illustrates a sequence of communications that can be made to manage flows when an imaging process is performed.

FIG. 7 provides a diagram of the sequence of communications that can occur when a client terminal is scheduled to be imaged. In FIG. 7, it will be assumed that management server 310 has already communicated with device agent 351 for the purpose of obtaining the client terminal information necessary to perform the imaging process. Also, for purposes of this example, it will be assumed that management server 310 already knows the MAC and/or IP addresses of imaging repository 302 and the client terminal to be imaged (which will be generally referred to as client terminal 102) as well as the ports used for imaging on imaging repository 302 and client terminal 102. However, some or all of this information could be obtained as part of initiating the imaging process.

Initially, management server 310 can instruct client terminal 102 (via device agent 351) to perform any necessary steps to prepare for imaging. After performing these steps, client terminal 102 can notify management server 310.

Then, management server 310 can communicate with SDN controller 306a to cause one or more entries to be created and/or updated in one or more flow tables to cause flows pertaining to the imaging to be prioritized or otherwise managed. As described above, management server 310 can employ the MAC and/or IP addresses and/or ports of client terminal 102 and image repository to create/update the flow table entry. Also, the priority assigned to a particular entry can be based on the client terminal information and any governing policy. For example, a higher priority may be assigned to entries pertaining to a client terminal that has a particular OS. In other words, the client terminal information can be used in much the same manner as the VDI session details to determine how to create flow table entries as described above.

Assuming SDN controller 306a successfully creates/updates the entry, management server 310 will receive an acknowledgement. At this point, management server 310 can instruct image repository to commence the imaging process on client terminal 102. Because of the entry created/updated in the flow table, the network communications between image repository 302 and client terminal 102 containing the image will be prioritized or otherwise managed. For example, in some embodiments, it may be desirable to minimize the amount of bandwidth that an imaging process consumes to prevent overloading the network.

Once the imaging is complete, device agent 351 on client terminal 102 can perform any post imaging cleanup and notify management server 310 accordingly. In response, management server 310 can update and/or delete the previously created/updated entry or entries pertaining to the imaging of client terminal 102 by communicating appropriately with SDN controller 306a. Finally, based on an acknowledgement of the successful update and/or deletion of the entry, management server 310 may complete the imaging process. In this way, management server 310 can dynamically manage flows for a particular client terminal during an imaging process.

This dynamic management of SDN 306 during an imaging process can provide a number of benefits. For example, in typical scenarios, a large number of client terminals 102 will be imaged at the same time or within the same time period. Using the techniques of the present invention, management server 310 can monitor network performance and create/delete/update flow table entries to ensure optimal network performance. Additionally, management server 310 can schedule the imaging of client terminals 102 based on the monitored network performance. For example, management server 310 may trigger the imaging process for particular client terminal or set of client terminals only when bandwidth utilization is below some threshold.

As is known, a flow table entry can include a timeout parameter which defines the maximum amount of idle time before the entry will be expired. In some embodiments of the present invention, management server 310 can be configured to periodically update a flow table entry to prevent it from expiring. For example, a device may be connected for redirection resulting in a flow table entry being created to prioritize flows pertaining to the redirected device. However, if the device is not accessed for a period of time, the switch may expire the entry even though the device remains redirected. To prevent his from occurring, management server 310 can be configured to periodically update or refresh the flow table entry so that it remains valid as long as the device remains redirected.

To summarize, the present invention provides a way to prioritize or otherwise manage flows in a SDN based on how a client terminal or VDI session is currently being used. Because the VDI session information and client terminal information is obtained from device agents 351, 352, this prioritization can be accomplished independently of the remote display protocol and the client terminal OS.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing flows in a software-defined network (SDN), the method comprising:
   detecting, at a device agent on a virtual desktop infrastructure (VDI) server, a change in a status of a VDI session established by a client terminal on the VDI server;

notifying a management server of the change in the status of the VDI session, notifying including providing VDI session details for the VDI session, the VDI session details including information that defines a network connection between the VDI server and the client terminal; and based on the change in the status, updating, by the management server, a flow table of the SDN to create, update or delete a flow table entry pertaining to the VDI session using the VDI session details to thereby alter a priority of flows pertaining to the VDI session.

2. The method of claim 1, wherein the change in the status of the VDI session comprises the creation of the VDI session on the VDI server.

3. The method of claim 2, wherein updating the flow table comprises creating or updating a flow table entry to prioritize flows pertaining to the VDI session.

4. The method of claim 3, wherein the flows are prioritized in accordance with one or more policies that are identified based on the VDI session details.

5. The method of claim 1, wherein the change in the status of the VDI session comprises the disconnection of the VDI session on the VDI server, and wherein updating the flow table comprises deleting a flow table entry pertaining to the VDI session.

6. The method of claim 1, wherein the change in the status of the VDI session comprises redirection of a device to the VDI server.

7. The method of claim 6, wherein updating the flow table comprises creating or updating a flow table entry to prioritize flows pertaining to the redirected device.

8. The method of claim 7, wherein the flows are prioritized in accordance with one or more policies that are identified based on the VDI session details.

9. The method of claim 8, wherein the VDI session details include one or more of an identifier, class, subclass, or protocol of the redirected device and the one or more policies are identified based on the one or more of the identifier, class, subclass, or protocol.

10. The method of claim 1, wherein the change in the status of the VDI session comprises disconnection of a device that was redirected to the VDI server, and wherein updating the flow table comprises deleting a flow table entry pertaining to the redirected device.

11. The method of claim 1, wherein the change in the status of the VDI session comprises commencement of multimedia redirection in the VDI session, and wherein updating the flow table comprises updating or creating a flow table entry pertaining to the VDI session.

12. The method of claim 1, wherein the change in the status of the VDI session comprises terminating multimedia redirection in the VDI session, and wherein updating the flow table comprises deleting a flow table entry pertaining to the VDI session.

13. The method of claim 1, wherein the VDI session details include one or more of a MAC address, IP address, or port of a client terminal that established the VDI session and one or more of a MAC address, IP address, or port of the VDI server, and wherein updating the flow table comprises creating, updating, or deleting one or more flow table entries in the flow table using the VDI session details.

14. A method for managing flows in a software-defined network (SDN), the method comprising:
determining, at a management server, that a client terminal is to be imaged using an image stored in an imaging repository;
updating, by the management server, a flow table in the SDN to prioritize flows between the client terminal and the imaging repository;
instructing the imaging repository to commence imaging the client terminal; and
upon receiving notification that the imaging of the client terminal has completed, updating the flow table to cease the prioritization of the flows between the client terminal and the imaging repository.

15. One or more computer storage media storing computer executable instructions which when executed by one or more processors implement a method for prioritizing flows in a SDN, the method comprising:
detecting, at a device agent that is executing on a VDI server, a change in status of a VDI session established by a client terminal on the VDI server;
sending, by the device agent, a notification of the change in status to a management server, the notification including VDI session details for the VDI session, the VDI session details including information that defines a network connection between the VDI server and the client terminal; and
in response to the notification, updating, by the management server, a flow table of the SDN to create, update, or delete a flow table entry pertaining to the VDI session using the VDI session details to thereby alter a priority of flows that pertain to the VDI session.

16. The computer storage media of claim 15, wherein the change in status comprises connection of a device to the client terminal for redirection to the VDI server or disconnection of a device that has been redirected to the VDI server.

17. The computer storage media of claim 15, wherein the change in status comprises creation or disconnection of the VDI session.

18. The computer storage media of claim 15, wherein the change in status comprises commencing or terminating multimedia redirection in the VDI session.

19. The computer storage media of claim 15, wherein the flow table entry includes one or more of a MAC address, an IP address, or a port of the client terminal and one or more of a MAC address, an IP address, or a port of the VDI server.

* * * * *